Patented Oct. 11, 1938

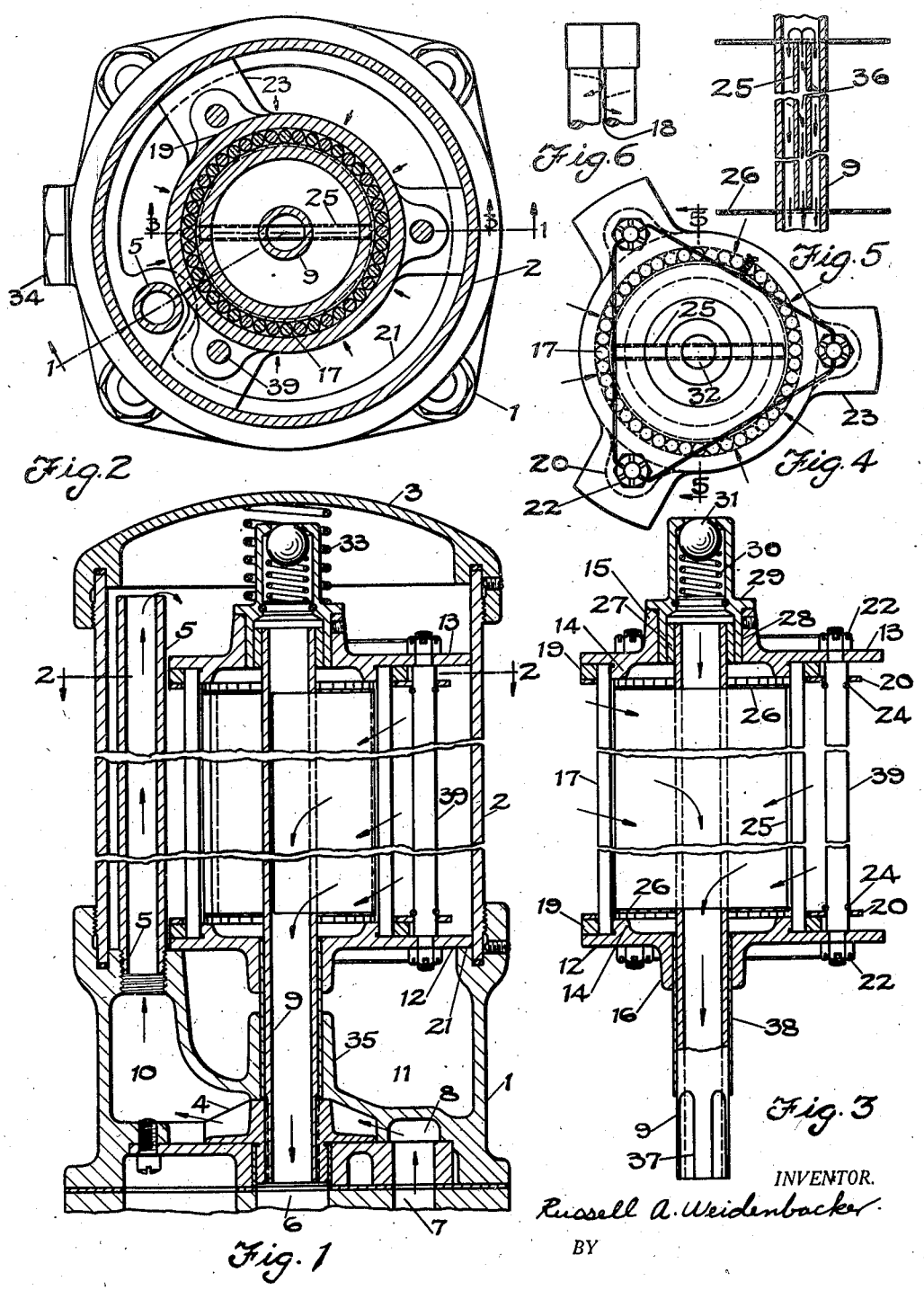

2,132,770

UNITED STATES PATENT OFFICE 2,132,770

OIL FILTERING MEANS

Russell A. Weidenbacker, Haverford, Pa.

Application December 31, 1935, Serial No. 56,917

4 Claims. (Cl. 210—169)

This invention relates to oil filters and is particularly designed to provide a very rugged type of filtering means of an improved construction for filtering oil used in lubricating internal combustion engines or wherever a sturdy filter is required which will not readily get out of order and which will function continuously for long periods of time without adjustment or attention other than an occasional draining of the sediment chamber in the bottom of the filter.

Another object of the invention is to provide an oil filtering means which will permit a continuous flow of oil through the filter, the construction of the filtering means being such that if a greater volume of oil is forced into the filter than the capacity of the filtering means can filter, it will nevertheless flow through the filter and be cleaned in proportion to the volume capable of being taken care of by the filtering parts.

An additional object more specifically is to provide a filtering means having a plurality of equal length round wires, quills or rollers minutely separated for filtering the oil and arranged vertically in cylindrical form around coacting hollow rotor vanes extending from and in communication with a centrally located outlet pipe.

An additional object is to provide a filtering means having features and details which will appear from the specification and claims, so constructed that it can be used in a filter wherein the construction is such that the flow of the oil through the filter acts as a power member for causing certain parts cooperating with the filtering element of the present invention to function during the filtering operation. Such a filter is shown in my application Serial Number 33,380 filed July 26, 1935.

An additional object of the invention is to provide a construction of the present invention, which will interchange with the filtering means shown in the illustration of the filter of said application with the result that one type of filtering means may be substituted for the other type within the same filter.

A preferred embodiment of the invention showing the mechanism by which I attain these objects is illustrated in the accompanying drawing in which—

Fig. 1 is a vertical sectional view through a filter disclosing an embodiment of the invention, the section being taken on line 1—1 of Fig. 2.

Fig. 2 is a transverse sectional view through Fig. 1 on the line 2—2.

Fig. 3 is a vertical sectional view through the filtering means only of Fig. 2, the section being taken on the line 3—3 and shows the present invention as it appears when removed from the filter.

Fig. 4 is a plan view of Fig. 3.

Fig. 5 is a fragmentary vertical sectional view through Fig. 4 on the line 5—5 showing the rotor construction only.

Fig. 6 is an enlarged fragmentary detailed view showing the construction of the upper and lower ends of the rollers.

Similar numbers refer to similar parts throughout the several views.

The base 1, the drum 2, top 3, turbine 4, inlet pipe 5 and associated parts constitute parts of the filter cooperating with the present invention and while not parts of the present invention, these and their associated parts function with the present invention in exactly the same manner as they function with the filtering means illustrated in my application previously referred to.

Referring to Fig. 1 the filter is bolted to an engine or other device so that oil may be forced through the passageway 7 into the filter and through the passageway 6 from the filter. Oil entering through passageway 7 flows into chamber 8 and into contact with a turbine 4 arranged in a communicating chamber, rotates tube 9 and emerges into chamber 10 and then passes up pipe 5 overflowing and filling the interior of drum 2, passing radially inward through the element of the filtering means hereinafter described and flows down outlet pipe 9 through passageway 6 to the point of utilization. The oil pump will maintain this flow of oil through the filter and although the pressure of the pump may vary widely the filter element is designed to withstand high pressure without damage.

The base 1 is provided with a sludge chamber 11 so that grit, dirt and other foreign substances in the oil within the drum 2 and surrounding the filter element will either remain in suspension or fall by gravity into the sludge chamber 11. The finer particles of grit and the like usually remain in suspension while the filter is in operation but when the circulation of oil stops this grit and the like will gradually fall by gravity into the sludge chamber 11 from which it may readily be withdrawn by unscrewing the plug 34.

It will be noted that plates 12 and 13 are provided in the form of spiders the central portions being solid while the outer parts of each are formed with three arms. The outer edges of the arms 23 centralize the filter element in the bore of drum 2 and the arms of the lower plate 12 rest upon the flange 21 of the base 1. Each of the plates 12 and 13 have a low cylindrical outlying wall 14 extending in one case upward from plate 12 and in the other case downward from plate 13. These walls are formed concentric with the bores of their tubular extensions 16 and 15. While I have illustrated these outlying walls 14 as being of integral construction with the plates 12 and 13 to minimize cost, they may be attached as separate pieces without departing from the spirit of the invention. Arranged between the plates 12 and 13 tangent to walls 14 at their ends and in contact with one another at said ends and completely encircling the walls 14 are slender rollers or bars 17 circular in section. As illustrated in Fig. 6 the rollers have short bands of contact at their upper and lower ends leaving spaces 18 between the rollers intermediate said end bands, but similar intermediate contacting bands on the rollers may be used without departing from the spirit of the invention. The spaces 18 between the rollers are very small permitting oil to pass radially inward between the spaces but holding back dirt, grit and the like and said spaces may range from a separation between rollers of a few thousandths of an inch downward to a ten thousandths of an inch depending upon the degree of filtration desired. The spaces between the rollers are preferably formed by grinding or undercutting the diameters of the rollers for their full circumference, at the points between the bands of contact, to such diameters as will produce the desired separations between them. This procedure furnishes a very accurate method of controlling the amount of separation between the rollers intermediate said bands of contact. Also any other method which will accurately separate the rollers will be satisfactory. The exactness with which the rollers are held in contact with one another without binding is maintained at all times by accurately sized retaining rings 19, which are placed over the ends of the roller assembly, holding the rollers at the same time in contact with the outer circumference of the walls 14 and in turn the rings 19 are held in position against the upper and lower plates 13 and 12 by thin discs 20 having extensions arranged to fit over shouldered bolts 38 whose threaded ends carry nuts 22 which when tightened hold the roller assembly together. The discs 20 are held in position by spring locking rings 24 sprung into grooves provided at the ends of bolts 39.

A very desirable method of constructing the filter element is to grind all rollers to exact diameters and length with their ends ground square with their axis, the inner bores of rings 19 ground to fit the outer diameter of the roller assembly without binding, said bores formed at exact right angles to their horizontal faces, the outer surface of rings 14 ground to exact right angles to the ground faces of the end plates 12 and 13 where they contact the ends of the rollers, said outer surface of rings 14 fitting the inner diameter of the roller assembly, said inner diameter being that formed when all the rollers are in contact with one another at their ends. All ground parts are hardened and polished.

This method of construction insures an exactness of fits which makes it possible to float the rollers 17 endwise or clamp them endwise, but in either case the fits being close there will be no oil seepage over the ends of the rollers. In carrying out this feature of the invention I have provided in the arrangement for clamping the roller assembly shouldered bolts or studs 39 so that the length of the rollers and the distance between shoulders on the bolts or studs may be adjusted to allow clearance for floating the rollers or for clamping them endwise as desired. When it is desired to allow the rollers to float or move around, the lengths of the bolts between shoulders are made slightly greater than the overall lengths of the rollers, but if a fixed or clamped arrangement of the rollers is preferred the shouldered bolts are made the same length or slightly less than the length of the rollers so that when the nuts 22 are tightened the rollers will be unable to move as they will be clamped endwise between plates 12 and 13. Also very thin shims may be inserted at the ends of the shouldered bolts between said shoulders and the faces of plates 12 and 13 for obtaining the necessary clearances to float the rollers, then the lengths of the rollers and the distances between shoulders on the bolts may be made the same. The advantage in floating the rollers and thereby permitting axial rotation, occurs, when the very smallest limits of separations of the rollers are used, as this movement provides further assistance to the internal rotary vanes in sweeping any lodgings of foreign matter from between the separations, as it is impossible for the separations to clog with foreign particles from without with this motion present.

Extending vertically between but not touching the inner horizontal faces of the cylindrical walls 14 are vanes 25 extending from each side of a central oil outlet tube or pipe 9, rotatably arranged in the tubular extensions 15 and 16 of end plates 13 and 12. These vanes are hollow, their interiors being in communication with the interior of the tube 9 forming an outlet for the oil which has passed through the separations between the rollers into the interior of the roller element assembly and then flows under pressure thru the vanes into the tube 9 and down to outlet 6 and the point of utilization. The edges of the vanes 25 while they are in close communication with the inner surface of the bars 17 they do not touch at any point. The bushing 38 acts as a bearing for rotatably mounting the lower end of the tube 9 and centers in the tubular extension 16 of plate 12 while the bushing 27 forms a bearing for rotatably mounting the upper end of tube 9, said bearing being centrally located in an extension of the valve casing 28 which in turn centers in the tubular extension 15 of the upper plate 13 and is carried by a flange 29 which rests upon the upper end of the tubular extension 15. The oil outlet pipe 9 and its communicating extensions 25 have been constructed in the manner illustrated to minimize costs and consists of two rectangular plates passing through aligned slots in the walls of the tube 9 and welded or otherwise attached to their respective sides of the tube thereby effecting a space between them, opening into the tube 9 at the top and bottom at the points where they pass through the tube. The top and bottom openings between the portions of the plates which extend outward from each side of the tube are closed by circular discs 26 fitting over the tube 9 and welded or otherwise made fast and oil tight to the edges of the vanes and the outer surface of the tube. The discs 26 are useful in assembling, serving as a support for the rollers. The number of vanes extending from the tube may be varied without departing from the spirit of the invention, also a cast or otherwise fabricated construction of the vanes and tube will be satisfactory.

The oil outlet tube is extended beyond the bearing or sleeve 38 a short distance and on this length a short spline fitting 37 is cut which engages a similar spline fitting cut in the bore of turbine 4 forming a rigid driving connection when engaged but one which may be readily disconnected.

The valve casing 28 which is arranged for rotatably mounting the oil outlet pipe 9 has a spring 30 arranged in its upper section which presses upward against a ball valve 31 covering an opening 32. By varying the tension of the spring 30 there will be a greater or less resistance to the downward movement of the ball valve 31. For instance if the volume of oil passing through the filter is within the capacity of the filter the pressure will not be sufficient to unseat the valve and all of the oil will be compelled to pass through the filtering element but if for any reason the pressure of the oil should rise above the pressure for which the valve is set the ball will move inward away from its seat and allow the oil to flow directly into the tube 9 whereby it will be impossible to damage the filter from excessive pressure.

After the parts have been assembled as illustrated in Fig. 3 the entire assembly is placed in a filter of the type illustrated in Fig. 1 with the splined end of pipe 9 engaging the splined hole of the turbine 4 and the sleeve 38 centering in the bore of the tubular boss 35 in the base casting 1 and with the lower face of plate 12 coming to rest on the circular ledge 21. A spring 33 is placed over the top portion of the valve casing 28 with one end bearing against the flange 29 and the opposite end pressing against the inside of top 3, which is screwed in place, holding the filtering means firmly against the flange 21 of base 1 and the filter is then ready for operation. The oil flowing through the filter will rotate the tube 9 and its attached vanes 25, flow into the bore of drum 2 which it will quickly fill and then the continuous flow of oil will cause some of the oil to pass radially inward through the separations between the rollers, as at 18 Fig. 6, comprising the filter element, enter through the openings 36 Fig. 5 in the vertical edges of the vanes 25 and flow into the central tube 9 out through the openings at the top and bottom of the vanes within the tube and then downward to the point of distribution. The vanes as they rotate set in motion the inner column of filtered oil causing a creeping action of the rollers, if they are not clamped, around the inner fixed raceways and in turn are themselves rotated about their own axis. The sweeping action of the vanes 25 forces some of the oil back through the separations 18 and this action augmented from time to time by a violent reverse pressure discharge of oil through the jet like edges of the vanes occurring with the unseating of the ball valve 31 sprays the separations between the rollers from within continuously as in rotating the vertical edges of the vanes pass over one separation to the other. The combined effect of this action is to cause all foreign matter to stay entirely free of the separations between the bars or rollers of the filter element during its operation, settling out by gravity when all motion ceases, only the finer particles remain in suspension during the operation of the filter and after the oil pump is stopped and then restarted there is no tending to stir up the sediment at the bottom of the filter as all motion is well above this area and this action is further prevented by having the oil inlet at the top of the filter.

In constructing the rollers, wires or quills of the filter element any desired material may be used which will resist or can be treated to resist the effects upon it of oil and abrasion and the rollers may be hollow or solid in cross section.

I claim:

1. In an oil filter, a filtering element comprising an arrangement of rollers disposed in cylindrical formation and registering in end plates for holding said rollers in functioning position whereby infinitesimal spaces will be presented between the rollers, means for cleaning the filter comprising a rotating central tube within said cylindrical formation, aligned slots longitudinally arranged in the central tube, parallel, spaced, bladed members secured in the slots and extending outwardly adjacent the rollers and upwardly and downwardly adjacent the end plates, said bladed members providing a passage therebetween through which the filtered oil may flow radially inward into the tube and then downward to the discharge point, means for centering the tube at each end in the end plates, driving means attached to the tube for producing rotation of the tube and attached bladed members, thereby swirling the column of filtrate and setting in rotation the rollers to dislodge obstructions, and means comprising an inwardly opening spring pressed valve sealing and communicating with the upper end of the outlet tube and acting so as to relieve excessive oil pressure from without.

2. An oil filter as specified in claim 1 provided with bars connecting said end plates for maintaining same in functioning relationship at all times.

3. The combination, in an oil filter, of a plurality of rollers having minute interspaces, with end plates having spaced, concentric, annular ribs for retaining said rollers in functioning relationship, at all times, one of said ribs on each plate being integral with said plate the other of said ribs being removable and clamped thereon, and locking means therefore secured by rings lodged in grooves provided in bars connecting said end plates.

4. The combination in an oil filter of a plurality of rollers having precise interspaces, with end plates having spaced annular ribs for retaining the ends of the rollers therebetween in functioning relationship and movable therein at all times so as to dislodge obstructions and connecting rods between the end plates, shouldered for spacing said plates apart and means thereon provided for locking said plates in position.

RUSSELL A. WEIDENBACKER.